US008976941B2

(12) United States Patent
Kim et al.

(10) Patent No.: US 8,976,941 B2
(45) Date of Patent: Mar. 10, 2015

(54) APPARATUS AND METHOD FOR REPORTING SPEECH RECOGNITION FAILURES

(75) Inventors: Hyun-Soo Kim, Yongin-si (KR); Myeong-Gi Jeong, Incheon (KR); Young-Hee Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1929 days.

(21) Appl. No.: 11/928,665

(22) Filed: Oct. 30, 2007

(65) Prior Publication Data
US 2008/0101556 A1 May 1, 2008

(30) Foreign Application Priority Data
Oct. 31, 2006 (KR) .................. 10-2006-0106404

(51) Int. Cl.
H04M 1/64 (2006.01)
G10L 15/01 (2013.01)
G10L 25/00 (2013.01)

(52) U.S. Cl.
CPC ........ *G10L 15/01* (2013.01); *G10L 25/00* (2013.01)
USPC .................. 379/88.01; 379/88.08

(58) Field of Classification Search
CPC ......... G10L 15/07; G10L 15/20; G10L 25/78; G10L 21/0208; G10L 15/02; H04B 15/00
USPC ........ 379/22.08; 704/233, 275, 227; 455/566, 455/501
See application file for complete search history.

(56) References Cited

U.S. PATENT DOCUMENTS

| 4,552,996 | A * | 11/1985 | de Bergh ........................ 379/24 |
| 6,263,307 | B1 * | 7/2001 | Arslan et al. .................. 704/226 |
| 6,336,091 | B1 * | 1/2002 | Polikaitis et al. ............. 704/233 |
| 6,415,253 | B1 * | 7/2002 | Johnson ....................... 704/210 |
| 7,386,443 | B1 * | 6/2008 | Parthasarathy et al. ........ 704/201 |
| 7,542,897 | B2 * | 6/2009 | Hutchison et al. ............. 704/214 |
| 7,933,771 | B2 * | 4/2011 | Chang et al. .................. 704/233 |
| 8,019,050 | B2 * | 9/2011 | Mactavish et al. ......... 379/22.08 |
| 8,296,138 | B2 * | 10/2012 | Parthasarathy et al. ........ 704/231 |
| 8,577,678 | B2 * | 11/2013 | Nakadai et al. ................ 704/233 |
| 2001/0000190 | A1 * | 4/2001 | Oshikiri et al. ................ 704/233 |
| 2002/0103643 | A1 * | 8/2002 | Rotola-Pukkila et al. ..... 704/233 |
| 2002/0107695 | A1 * | 8/2002 | Roth et al. ..................... 704/275 |
| 2004/0176953 | A1 * | 9/2004 | Coyle et al. ................... 704/253 |
| 2004/0260547 | A1 * | 12/2004 | Cohen et al. .................. 704/233 |
| 2005/0027527 | A1 * | 2/2005 | Junkawitsch et al. ......... 704/243 |
| 2006/0229869 | A1 * | 10/2006 | Nemer .......................... 704/226 |
| 2006/0229880 | A1 * | 10/2006 | White et al. ................... 704/275 |
| 2006/0247927 | A1 * | 11/2006 | Robbins et al. ............... 704/225 |
| 2007/0033028 | A1 * | 2/2007 | Yao ................................ 704/233 |

(Continued)

FOREIGN PATENT DOCUMENTS

JP  2001-100790  4/2001
KR  1020060063437  6/2006

*Primary Examiner* — Fan Tsang
*Assistant Examiner* — Van D Huynh
(74) *Attorney, Agent, or Firm* — The Farrel Law Firm, P.C.

(57) ABSTRACT

Provided are an apparatus and method for reporting speech recognition failures. The method includes detecting pure speech data from input speech data and outputting the detected pure speech data; checking at least one speech recognition failure for the pure speech data; and ascertaining speech recognition failure reasons from a check-result for the speech recognition failures and outputting the ascertained speech recognition failure reasons.

10 Claims, 2 Drawing Sheets

(56) References Cited

U.S. PATENT DOCUMENTS

| | | | |
|---|---|---|---|
| 2007/0213981 A1* | 9/2007 | Meyerhoff et al. | 704/243 |
| 2008/0167868 A1* | 7/2008 | Kanevsky et al. | 704/233 |
| 2011/0026722 A1* | 2/2011 | Jing et al. | 381/71.1 |
| 2011/0105190 A1* | 5/2011 | Cha et al. | 455/566 |
| 2011/0224980 A1* | 9/2011 | Nakadai et al. | 704/233 |
| 2012/0323573 A1* | 12/2012 | Yoon et al. | 704/236 |

* cited by examiner

APPARATUS AND METHOD FOR REPORTING SPEECH RECOGNITION FAILURES

PRIORITY

This application claims priority under 35 U.S.C. §119(a) an application entitled "Apparatus and Method for Reporting Speech Recognition Failures" filed in the Korean Industrial Property Office on Oct. 31, 2006 and assigned Serial No. 2006-106404, the contents of which are hereby incorporated by reference.

BACKGROUND OF THE INVENTION

1. Field of the Invention

The present invention relates to a speech recognition apparatus and method, and more particularly to an apparatus and method for reporting failure reasons to a user when speech recognition failures occur.

2. Description of the Related Art

Speech recognition technology is an element requisite for man-machine communication in next-generation technology areas, such as home networking, robotics, ubiquitous networking, etc., and is now suffering from restrictions on its performance, depending on an environment in which it is used. In reality, a mismatch between a development environment and an actual use environment of a speech recognition apparatus causes channel noise and ambient environmental noise, which makes it very difficult to commercialize speech recognition technology. Further, a recognition performance of a speech recognition apparatus is greatly affected by a pronunciation or speech habit of a speaker who uses a speech recognizer;

In general, a speech recognition apparatus, such as a speech-based user interface or a speech recognizer, requires an appropriate speech input for feature extraction or pattern matching that may be used in speech recognition. However, because of environmental factors, normal interaction often cannot obtain information as much as required in elemental technology. For example, when a user speaks too slow or fast or too loudly or quietly, when a user's speech is not recognized due to excessive noise, when a speech signal is cut off due to packet loss during speech signal transmission in a wireless communication system, and so forth, it is difficult for speech recognition to succeed. Presently, there is no way to overcome speech recognition failures due to environmental factors or an incorrect speech input itself.

As mentioned above, in conventional speech recognition, it is impossible to algorithmically cope with speech recognition failures when they are caused by environmental factors or an incorrect speech input itself.

SUMMARY OF THE INVENTION

Accordingly, the present invention has been made to solve the above-mentioned problems occurring in the prior art, and the present invention provides an apparatus and method for reporting failure reasons to a user when speech recognition failures occur.

Further, the present invention provides an apparatus and method for analyzing potential failure reasons that may cause speech recognition failures in a speech recognition process, such as noise, a transmission error, speech volume, speech rate and so forth, and automatically providing an analysis result to a user.

In accordance with an aspect of the present invention, there is provided an apparatus for reporting speech recognition failures, the apparatus including a speech data detection unit for detecting pure speech data from input speech data and outputting the detected pure speech data; a speech recognition failure check unit for checking at least one speech recognition failure for the pure speech data when the pure speech data is input therein and outputting a check-result for the speech recognition failures, the speech recognition failure check unit having modules, each of which determines the speech recognition failure according to each reason; a speech recognition failure determination unit for ascertaining speech recognition failure reasons from the check-result for the speech recognition failures when the check-result is input therein and outputting the ascertained speech recognition failure reasons; and a control unit for controlling the input speech data to be checked for at least one speech recognition failure through the respective modules of the speech recognition failure check unit, controlling the check-result for the speech recognition failures to be input into the speech recognition failure determination unit, and then controlling the speech recognition failure reasons output from the speech recognition failure determination unit to be reported to a user.

In accordance with another aspect of the present invention, there is provided a method of reporting speech recognition failures, the method including detecting pure speech data from input speech data and outputting the detected pure speech data; checking at least one speech recognition failure for the pure speech data; and ascertaining speech recognition failure reasons from a check-result for the speech recognition failures and outputting the ascertained speech recognition failure reasons.

The present invention provides proposes a way to analyze failure reasons when speech recognition failures occur in the course of performing a speech recognition process by a speech recognition apparatus, and report the analyzed failure reasons to a user, thereby preventing the failures from occurring. In the present invention, although speech recognition failure reasons are exemplified by the case where a user speaks too slow/fast or too loudly/quietly, the case where a user's speech is not recognized due to lots of noise, the case where a speech signal is cut off due to packet loss during speech signal transmission in a wireless communication system, and so forth, it is obvious that other failure reasons may also be reported to a user through separate failure checks.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
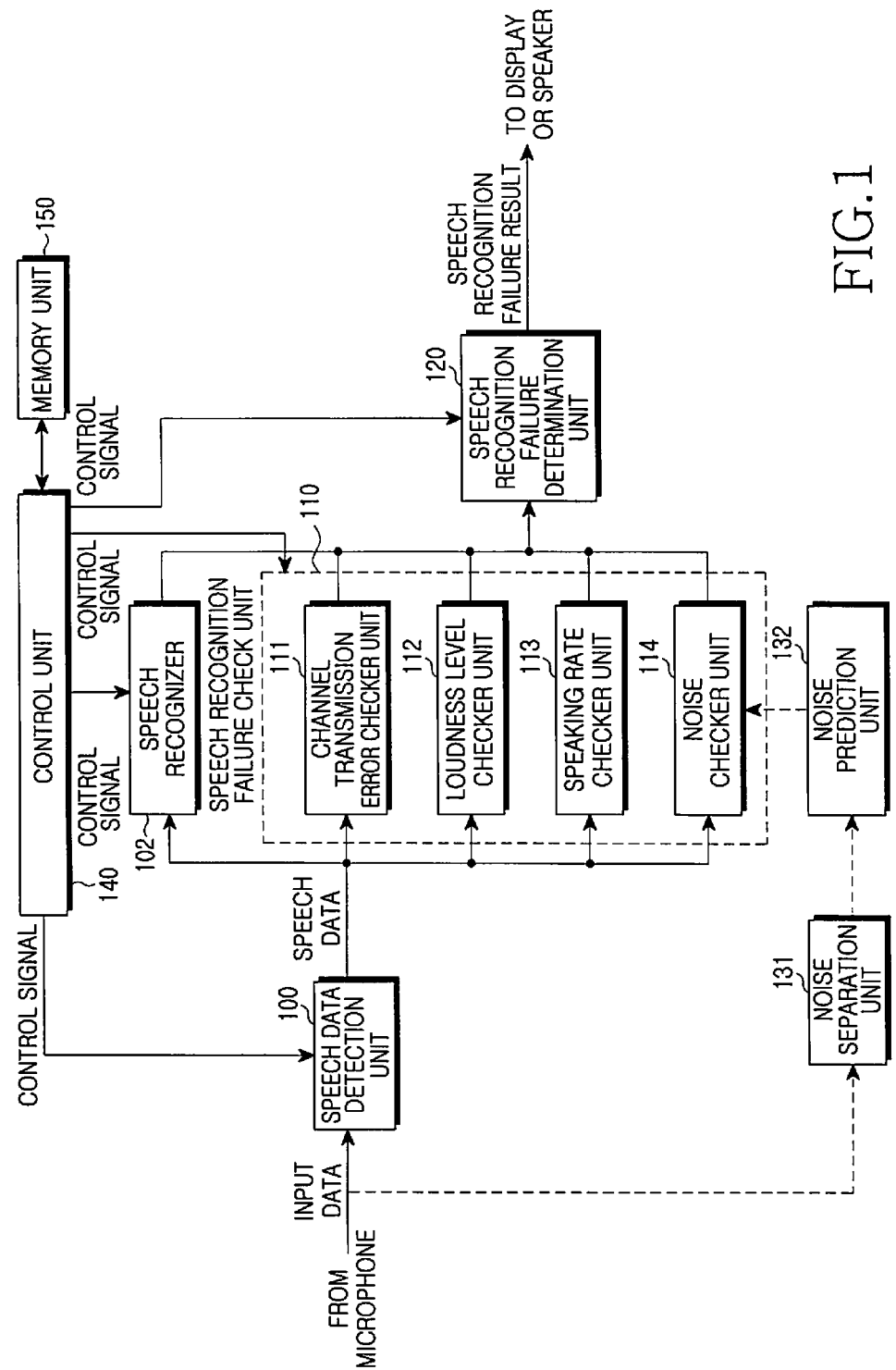
FIG. 1 is a block diagram illustrating the structure of a speech recognition apparatus for reporting failure reasons to a user when speech recognition failures occur, according to an exemplary embodiment of the present invention.

Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

FIG. 1 illustrates the structure of a speech recognition apparatus for reporting failure reasons to a user when speech recognition failures occur, according to an exemplary embodiment of the present invention. Referring to FIG. 1, the speech recognition apparatus includes a speech data detection unit 100, a speech recognizer 102, a speech recognition failure check unit 110, a speech recognition failure determination unit 120, a noise separation unit 131, a noise prediction unit 132, a control unit 140, and a memory unit 150. Although not depicted in FIG. 1, the speech recognition apparatus may further include a speech processing unit which has a display unit or a speaker corresponding to a constitutional element for reporting a result of speech recognition failures to a user.

The control unit 140 performs the overall control operation of the speech recognition apparatus. Particularly, in the present invention, the control unit 140 controls input speech data to be checked for at least one speech recognition failure through respective modules of the speech recognition failure check unit 110, controls a check-result to be input into the speech recognition failure determination unit 120, and then controls speech recognition failure reasons output from the speech recognition failure determination unit 120 to be reported to a user. An operation of the control unit 140 will be described below in detail with reference to FIG. 2.

The memory unit 150 may include a ROM (Read Only Memory) and a RAM (Random Access Memory) for storing a plurality of programs and data, and stores programs for controlling general operations of the speech recognition apparatus. According to an exemplary embodiment of the present invention, the memory unit 140 stores a plurality of reference values for failure detection. More specially, the memory unit 150 stores a first loudness level for identifying loudly spoken speech, a second loudness level for identifying quietly spoken speech, a first rate level for identifying rapidly spoken speech, and a second rate level for identifying slowly spoken speech. Further, the memory unit 150 stores a noise reference value for determining a failure which is caused by additional noise contained in input speech, and a transmission error reference value for determining a failure which is caused by transmission error occurrence according to channel transmission.

The speech data detection unit 100 is supplied, as an input, with an audio signal input through a microphone, and detects pure speech data from data of the input audio signal. The detected pure speech data is output to the speech recognizer 102 and the speech recognition failure check unit 110.

The speech recognizer 102 recognizes speech by analyzing a speech region in which the detected speech data exists. With regard to this, since the speech recognizer is a module for general speech recognition, it targets a commonly used word recognizer, and must be provided with a recognition score which recognized speech has. Further, a proper speech input level must be presented. A detailed description of a speech recognition operation will be omitted herein because it is not the subject of the present invention.

The speech recognition failure check unit 110 includes a channel transmission error checker unit 111, a loudness level checker unit 112, a speaking rate checker unit 113, and a noise checker unit 114. Reference will now be made to such modules constituting the speech recognition failure check unit 110.

The channel transmission error checker unit 111 determines the existence of a transmission error by analyzing non-received packets for a received speech signal.

The loudness level checker unit 112 performs a speech energy analysis function. The speech energy analysis function refers to a function of analyzing speech energy in speech data spoken by a user and presenting a result of speech intensity as an energy level in comparison with a reference predetermined in the speech recognition apparatus. Data of a speech region detected from a user's speech is analyzed in the time domain, and a result is presented by calculating energy of the actual region or by clipping the waveform of the speech data at a specific level so as to measure speech energy of the overall speech region and calculating the number of data above or below the level.

That is, the loudness level checker unit 112 is a module for checking the energy level of an input speech signal, and checks the loudness of input speech by comparing the energy level with a predetermined reference energy level. With regard to this, the loudness level checker unit 112 reads out a first loudness level for identifying loudly spoken speech and a second loudness level for identifying quietly spoken speech, which are stored in the memory unit 150, and compares speech loudness with each loudness level.

If a speech region in pure speech data extracted from input speech data is input at a loudness level higher than a specific threshold value (this may flexibly change according to systems), that is, the first loudness level, the loudness level checker unit 112 determines that a user speaks loudly. Further, if a speech region is input at a loudness level lower than a specific threshold value, that is, the second loudness level, the loudness level checker unit 112 determines that a user speaks quietly.

As mentioned above, the loudness level checker unit 112 estimates the energy level of a speech signal and determines if the estimated energy level of the speech signal is suitable for speech recognition. The method of estimating the energy level of a speech signal, as used herein, is merely an embodiment of the present invention, and other energy estimation methods may also be used for estimating the energy level of a speech signal.

1. Time-domain Analysis

1) Pure Speech Region Extraction

For estimating speech energy, it must be possible to analyze time-domain speech data. A direct speech data analysis and an analysis in units of blocks framed in a short-time duration must be enabled.

Further, speech energy is estimated only for a pure speech region within a detected speech data region. It must be possible to remove margin regions in the beginning and end portions of a speech data region detected in the speech data detection unit 100.

Further, it must be possible to estimate the zero crossing rate for time-domain speech data, and it must be possible to estimate the energy level for time-domain speech data.

Further, it must be possible to extract a pure speech region by analyzing the zero crossing rate and the energy level for time-domain speech data. Reference values for the zero crossing rate and the energy level, which are determination criteria for a speech region, must be transferred to input parameters of a corresponding function module.

2) Direct Sample Data Analysis

It must be possible to directly manipulate and analyze a time-domain speech data value.

Further, it must be possible to clip a speech data value with respect to a specific level value (absolute value) given as a threshold value. The level value with respect to which a speech data value is clipped must be transferred to input parameters of a corresponding function module.

It must also be possible to estimate the number of speech data greater than or equal to a threshold value. The estimated number of speech data is approximated as the ratio of length of residual data to the overall speech data. Using the analyzed ratio of length, the speech energy level of input speech data is estimated by comparison with a reference ratio.

3) Block Approximation Analysis

In order to simplify a feature for analyzing time-domain speech data, it must be possible to perform an analysis in units of speech data blocks framed in a short-time duration.

With regard to this, the loudness level checker unit 112 divides a speech data region into short time intervals, and the respective time intervals must be able to overlap with each other. Information on a time interval overlapping with a reference time interval must be transferred to input parameters of a corresponding function module in a time unit (milliseconds).

Further, it must be possible to estimate block energy values representative of the divided speech regions. The average of the squares of data within the speech region may be used as the energy value, or the average of the absolute values of data within the speech region may be used as the energy value in order to simplify the operation. The speech energy level of input speech data is estimated by comparing the estimated block energy values with a reference block energy value.

2. Result Generation

It must be possible to determine the speech energy level of input speech data by using speech energy information analyzed as described above. The speech energy level may be expressed using a representative value.

A speech energy level may be normalized in such a manner as to have a range of [−5, 5] corresponding to relative values in comparison with a reference value. An input energy level can be expressed by an input level of "−5" when it is level than or equal to or less than ⅕ of a proposed energy level, and can be expressed by an input level of "5" when it is greater than or equal to 5 times of the proposed energy level. When an input energy level is within a proposed energy level range, it can be expressed by an input level of "0".

Further, when an input energy level is expressed as mentioned above, a result may be given by representative values of 5 levels, as shown below in Table 1:

TABLE 1

| SYMBOL | MEANING | NOTE |
|---|---|---|
| TOO LOUD | too loud speech input | 4, 5 |
| LOUD | loud speech input | 2, 3 |
| NORMAL | moderate speech input | −1, 0, 1 |
| QUIET | quiet speech input | −3, −2 |
| TOO QUIET | too quiet speech input | −5, −4 |

The speaking rate checker unit 113 performs an speech rate analysis function. The speech rate analysis function refers to a function of estimating the number of syllables in speech data spoken by a user and presenting a result of analyzing an speech rate according to the corresponding number of syllables. Possible syllable combinations are composed by detecting combination of consonants and vowels spoken in a detected speech region, the overall number of syllables is estimated, and then the level of a speech rate corresponding to the estimated number of syllables is determined.

That is, the speaking rate checker unit 113 is a module for checking the rate of an input speech signal, and checks the rate of input speech by comparison with a predetermined reference rate level. With regard to this, the speaking rate checker unit 113 reads out a first rate level for identifying rapidly spoken speech and a second rate level for identifying slowly spoken speech, which are stored in the memory unit 150, and compares input speech rate with each rate level. If an input speech rate level is higher than the first rate level, the speaking rate checker unit 113 determines that a user speaks rapidly. Further, if an input speech rate level is lower than the second rate level, the speaking rate checker unit 113 determines that a user speaks slowly. More specially, the speaking rate checker unit 113 performs a function of estimating the number of syllables spoken in input speech data and checking if the length of speech data, corresponding to the estimated number of syllables, is suitable for speech recognition.

As mentioned above, the speaking rate checker unit 113 estimates the speaking rate of a speech signal and determines if the estimated rate level of the speech signal is suitable for speech recognition. The method of estimating the speaking rate of a speech signal, as used herein, is merely an embodiment of the present invention, and other speaking rate estimation methods may also be used for estimating the speaking rate of a speech signal.

1. Time-domain Analysis

1) Pure Speech Region Estimation

The speech rate of speech data is estimated only for a pure speech region within a detected speech data region. It must be possible to remove margin regions in the beginning and end portions of a speech data region detected in the speech data detection unit 100. Further, it must be possible to estimate the zero crossing rate for time-domain speech data. Further, it must be possible to estimate the energy level for time-domain speech data. Further, it must be possible to extract a pure speech region by analyzing the zero crossing rate and the energy level for time-domain speech data. Reference values of the zero crossing rate and the energy level, which are determination criteria for a speech region, must be transferred to input parameters of a corresponding function module.

2) Vowel Count Estimation

It must be possible to estimate the number of syllables used for estimating the speech rate. The number of syllables may be estimated by a method of estimating voiced sound regions and the number thereof. Further, a detected speech data region is divided into short time intervals, and the respective time intervals must be able to overlap with each other. Information on a time interval overlapping with a reference time interval must be transferred to input parameters of a corresponding function module in a time unit (milliseconds). Further, it must be possible to estimate block energy values and zero crossing rates representative of the divided speech regions. The average of the squares of data within the speech region may be used as the energy value, or the average of the absolute values of data within the speech region may be used as the energy value in order to simplify the operation. Further, it must be possible to discriminate voiced sound regions from voiceless sound regions by comparing the energy values and zero crossing rates according to regions with reference values. The discrimination reference values must be transferred to input parameters of a corresponding module. Further, it must be possible to follow up energy variation in order to estimate syllable transition in a voiced sound region. It must be possible to determine that syllable transition occurs when an increase and a decrease in energy variation are detected within a certain period of time.

2. Result Generation

It must be possible to estimate a speech rate by analyzing the whole speech to thereby estimate the number of syllables, calculating the speech time according to the estimated number of syllables, and then determining if the calculated speech time falls within a predetermined appropriate speech time. Further, an speech rate level may be normalized in such a manner as to have a range of [−1, 1] corresponding to relative values in comparison with a reference value. The estimated speech speech rate can be expressed by a level of "1" when it is faster than an appropriate speech rate range, and can be expressed by a level of "−1" when it is slower than the appropriate speech rate range.

Further, when the rate level of a speech signal is expressed as mentioned above, a result may be given by representative values of 3 levels, as shown below in Table 2:

TABLE 2

| SYMBOL | MEANING | NOTE |
|--------|---------|------|
| FAST | fast speech rate | 1 |
| NORMAL | moderate speech rate | 0 |
| SLOW | slow speech rate | −1 |

The noise separation unit 131 is a module for dividing an input speech signal into a speech region and a non-speech region and separating the current ambient noise from data of the non-speech region. Speech data detected in the speech data detection unit 100 includes silence regions of a certain level before/after pure spoken data. The noise separation unit 131 determines the existence of ambient noise at the current speech recognition time by analyzing an input level for a margin region of the speech data detection unit 100.

The noise prediction unit 132 acoustically analyzes the ambient noise separated from data of the non-speech region to thereby extract a statistical value. The extracted statistical value may be provided to the noise checker unit 114, which in turn uses the provided statistical value as a reference value.

The noise checker unit 114 performs an ambient noise analysis function. The ambient noise analysis function refers to a function of analyzing the intensity of ambient noise which is added to a speech region detected from speech data and presenting an analysis result. The beginning and end portions of the detected speech region include silence regions necessary for a speech analysis. How much noise is added to the speech region by the ambient environment is determined by analyzing data of the silence regions. Further, if data can be input from a microphone, into which speech is selectively input, independent of speech detection, a noise environment at a speech input point is estimated and used through a buffer of a certain size, and a result of the analysis into buffer data is presented until the staring point of speech is detected.

That is, the noise checker unit 114 is a module for checking to what extent additional ambient environmental noise is included in an input speech signal, and analyzes the amount of other signals, which are included in addition to a speech signal contained in a detected speech region, to thereby extract a quantitative value indicating ambient noise is included in input speech. The extracted noise value for the input speech signal is compared with a noise reference value stored in the memory unit 150. If the noise value for the input speech signal is greater than or equal to the noise reference value, the noise checker unit 114 determines that the current noise is too much to succeed in speech recognition.

As mentioned above, the noise checker unit 114 has estimates a nose level included in an input speech signal and determines if the estimated noise level of the speech signal is suitable for speech recognition.

The noise estimation method, as used herein, is merely an embodiment of the present invention, and other noise estimation methods may also be used for estimating a noise level included in an input speech signal.

1. Time-domain Analysis

1) Speech/Silence Region Division

In order to ascertain the existence of added noise, it must be possible to divide an input speech signal into a speech data region and a non-speech data region, and analyze each region. Further, it must be possible to estimate the zero crossing rate for time-domain speech data. Further, it must be possible to estimate the energy level for time-domain speech data. Further, it must be possible to discriminate a pure speech data region from a non-speech data region by analyzing the zero crossing rate and the energy level for time-domain speech data. Reference values of the zero crossing rate and the energy level, which are determination criteria for a speech region, must be transferred to input parameters of a corresponding function module.

2) Speech Region Analysis

It must be possible to ascertain additional noise included in a speech region. It must be possible to perform a function of examining an energy envelope in data of a speech region to thereby check if a region rising for a short time exists.

Further, it must be possible to estimate an envelope of speech energy levels from data within a speech region by using the squares of respective data samples. Further, it must be possible to detect energy boosting, which exists within a short time, by examining the estimated speech energy envelope.

3) Silence Region Analysis

In order to ascertain noise added to input speech data, it must be possible to check energy level of a non-speech region. Further, it must be possible to estimate the average energy level for the overall non-speech region. Further, it must be possible to determine the ambient environmental noise level of input speech data by using the analyzed additional noise information. The noise level added to input speech data may be expressed using a representative value.

2. Result Generation

An additional noise level as analyzed above may be normalized in such a manner as to have a range of [0, 5] corresponding to relative values in comparison with a reference value. Additional ambient noise can be expressed by a level of "5" when it is equal to or greater than ½ of speech signal energy, and can be expressed by a level of "0" when there is no additional ambient noise.

Further, a result may be given by 3 estimated representative values, as shown below in Table 3:

TABLE 3

| SYMBOL | MEANING | NOTE |
|--------|---------|------|
| CLEAN | negligible ambient noise | 0, 1 |
| NOISY | low ambient noise added | 2, 3 |
| TOO NOISY | high ambient noise added | 4, 5 |

The speech recognition failure determination unit 120 performs a speech compatibility determination function. The speech compatibility determination function refers to a function of determining if a speech region detected from a user's speech is compatible with speech recognition, based on a speech energy analysis result, an ambient noise analysis result, a speech rate analysis result and so forth. In order to determine if each analysis result output from the speech recognition failure check unit 110 falls within a suitable range for speech recognition, and determine what the biggest reason is for the unsuitability of the result, the speech recognition failure determination unit 120 may use the most reasonable deduction formula which is derived from actual experimental results conducted in various environments.

That is, the speech recognition failure determination unit 120 is a module which is supplied, as an input, with the respective recognition failure check-results output from the speech recognition failure check unit 110, and determines a final speech recognition result. This speech recognition failure determination unit 120 performs a function of determining if input speech is compatible with speech recognition, based on a combination of result values from the respective modules of the speech recognition failure check unit 110.

In other words, the speech recognition failure determination unit 120 performs a function determining to what extent speech spoken by a user is compatible with speech recognition, based on analysis results according to modules. Subsequently, if the speech is determined to be incompatible with speech recognition, the speech recognition failure determination unit 120 outputs the major reason for incompatibility through a display or a speaker under the control of the control unit 140.

Reference will now be made in detail to an operation of determining a final speech recognition result based on the respective input speech recognition failure check-results, output from the speech recognition failure check unit 110, in the speech recognition failure determination unit 120.

1. Recognition Score Permission

It must be possible to verify the reliability of recognition by ascertaining a speech recognition result value. Further, it must be possible to compare the recognition result value with a specific reference value and determine whether to accept the recognition result based on the comparison. A recognition level as a reference value must be transferred to an input of a corresponding module.

2. Dominant Failure Reason Detection

When a recognition result is rejected, it must be possible to determine the major reason for the rejection of the recognition result. When the conditions are as shown below in Table 4, the major reason for rejection is determined to be "loud speech".

TABLE 4

| speech energy estimation result | ambient environmental noise estimation result | speech rate estimation result |
|---|---|---|
| LOUD, TOO LOUD | CLEAN | — |
| TOO LOUD | — | — |

Further, when the conditions are as shown below in Table 5, the major reason for rejection is determined to be "quiet speech".

TABLE 5

| speech energy estimation result | ambient environmental noise estimation result | speech rate estimation result |
|---|---|---|
| QUIET, TOO QUIET | CLEAN | SLOW, NORMAL, FAST |
| TOO QUIET | CLEAN | SLOW, NORMAL, FAST |

Further, when the conditions are as shown below in Table 6, the major reason for rejection is determined to be "ambient noise".

TABLE 6

| speech energy estimation result | ambient environmental noise estimation result | speech rate estimation result |
|---|---|---|
| LOUD, NORMAL, QUIET, TOO QUIET | NOISY | — |
| LOUD, NORMAL, QUIET, TOO QUIET | TOO NOISY | — |

Further, when the conditions are as shown below in Table 7, the major reason for rejection is determined to be "slow speech rate".

TABLE 7

| speech energy estimation result | ambient environmental noise estimation result | speech rate estimation result |
|---|---|---|
| NORMAL | CLEAN | SLOW |

Further, when the conditions are as shown below in Table 8, the major reason for rejection is determined to be "fast speech rate".

TABLE 8

| speech energy estimation result | ambient environmental noise estimation result | speech rate estimation result |
|---|---|---|
| NORMAL | CLEAN | FAST |

3. Result Generation

It must be possible to derive the probability that a speech recognition result is valid, by using an energy level analysis result, an ambient noise estimation result and a speech rate check-result.

Further, the validity of speech recognition may be normalized in such a manner as to have a range of [0, 5] corresponding to relative values. Criteria for normalization are not separately determined, and may be determined based on experimental results. The validity of speech recognition can be expressed by a level of "5" when all analysis results of the respective modules are determined to be compatible, and can be expressed by a level of "0" when all the analysis results are determined to be incompatible. Thus, a determination result for speech recognition failures is output as shown below in Table 9.

TABLE 9

| SYMBOL | MEANING | NOTE |
|---|---|---|
| EXCELLENT | wholly accept recognition result | 5 |
| GOOD | proper input speech data, accept recognition result | 4 |
| NORMAL | ambiguous input speech data, compare with recognition result | 2, 3 |
| BAD | improper input speech data, doubt recognition result | 1 |
| TERRIBLE | ignore recognition result | 0 |

Figure 2:
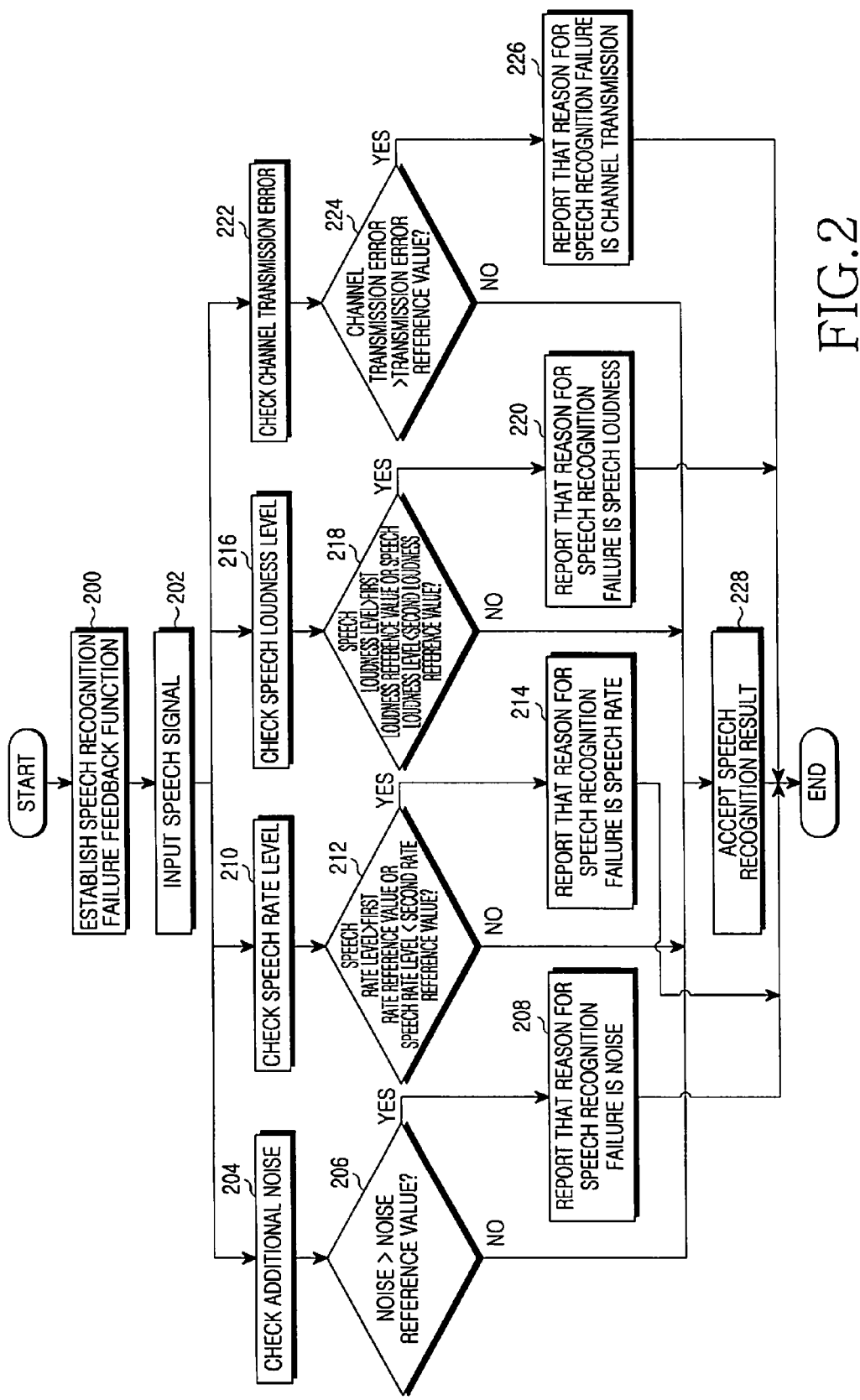
FIG. 2 is a flowchart illustrating a procedure of reporting failure reasons to a user when speech recognition failures occur, in a speech recognition apparatus according to an exemplary embodiment of the present invention.

Reference will now be made to a procedure of reporting failure reasons to a user in a speech recognition apparatus of FIG. 1 when speech recognition failures occur, with reference to FIG. 2.

First, in step 200, the control unit 140 recognizes that a speech recognition failure feedback function is established. If a speech signal is input in step 202, the control unit 140 proceeds to steps 204, 210, 216 and 222, and checks if failures occur in the input speech signal.

In step 204, the control unit 140 controls the noise checker unit 114 to check an additional noise level included in the input speech signal. The additional noise check may be performed as described for the noise checker unit 114 in FIG. 1. Subsequently, the control unit 140 proceeds to step 206, and controls the noise checker unit 114 to check if the additional noise exceeds a predetermined noise reference value. If the additional noise exceeds the predetermined noise reference value, the control unit 140 proceeds to step 208, and reports that the reason for speech recognition failure occurrence is the noise. This report may be output as a message through a screen of the speech recognition apparatus, or may be output as a voice through a speaker. However, if a result of the check in step 206 shows that the additional noise does not exceed the predetermined noise reference value, the control unit 140 proceeds to step 228, and accepts the speech recognition result. Accepting the speech recognition result means that the control unit 140 recognizes the non-existence of failures and performs recognition operations according to the result from the speech recognizer 102.

Further, if the control unit 140 proceeds from step 202 to step 210, it controls the speaking rate checker unit 113 to check the rate level of the input speech signal. The rate level check of the input speech signal may be performed as described for the speaking rate checker unit 113 in FIG. 1. Subsequently, the control unit 140 proceeds to step 212, and controls the speaking rate checker unit 113 to check if the rate level of the input speech signal exceeds a first rate reference value or falls short of a second rate reference value. If the rate level of the input speech signal exceeds the first rate reference value, the control unit 140 recognizes that the speech is fast. If the rate level of the input speech signal falls short of the second rate reference value, the control unit 140 recognizes that the speech is slow. Subsequently, the control unit 140 proceeds to step 214, and reports that the reason for speech recognition failure occurrence is the speech rate. With regard to this, when the control unit 140 recognizes that the speech is fast because the rate level of the input speech signal exceeds the first rate reference value, the control unit 140 outputs a report indicating that speech recognition failure has been caused by fast speech. Further, when the control unit 140 recognizes that the speech is slow because the rate level of the input speech signal falls short of the second rate reference value, the control unit 140 outputs a report indicating that speech recognition failure has been caused by slow speech. This report may be output as a message through the screen of the speech recognition apparatus, or may be output as a voice through the speaker. However, if a result of the check in step 212 shows that the rate level of the input speech signal does not exceed the first rate reference level and does not falls short of the second rate reference value, the control unit 140 proceeds to step 228, and accepts the speech recognition result.

Further, if the control unit 140 proceeds to step 216, it controls the loudness level checker unit 112 to check the loudness level of the input speech signal. The loudness level check of the input speech signal may be performed as described for the loudness level checker unit 112 in FIG. 1. Subsequently, the control unit 140 proceeds to step 218, and controls the loudness level checker unit 112 to check if the loudness level of the input speech signal exceeds a first loudness level reference value or falls short of a second loudness level reference value. If the loudness level of the input speech signal exceeds the first loudness level reference value, the control unit 140 recognizes that the speech is loud. If the loudness level of the input speech signal falls short of the second loudness level reference value, the control unit 140 recognizes that the speech is quiet. Subsequently, the control unit 140 proceeds to step 220, and reports that the reason for speech recognition failure occurrence is the speech loudness. With regard to this, when the control unit 140 recognizes that the speech is loud because the loudness level of the input speech signal exceeds the first loudness level reference value, the control unit 140 outputs a report indicating that speech recognition failure has been caused by loud speech. Further, when the control unit 140 recognizes that the speech is quiet because the loudness level of the input speech signal falls short of the second loudness level reference value, the control unit 140 outputs a report indicating that speech recognition failure has been caused by quiet speech. This report may be output as a message through the screen of the speech recognition apparatus, or may be output as a voice through the speaker. However, if a result of the check in step 218 shows that the loudness level of the input speech signal does not exceed the first loudness level reference level and does not falls short of the second loudness level reference value, the control unit 140 proceeds to step 228, and accepts the speech recognition result.

Further, if the control unit 140 proceeds to step 222, it controls the channel transmission error checker unit 111 to check the transmission error rate for the input speech signal. Subsequently, the control unit 140 proceeds to step 224, and controls the channel transmission error checker unit 111 to check if the transmission error rate for the input speech signal exceeds a predetermined transmission error reference value. If the transmission error rate for the input speech signal exceeds the predetermined transmission error reference value, the control unit 140 proceeds to step 226, and reports that the reason for speech recognition failure occurrence is the channel transmission error. This report may be output as a message through a screen of the speech recognition apparatus, or may be output as a voice through a speaker. However, if a result of the check in step 224 shows that the transmission error rate for the input speech signal does not exceed the predetermined transmission error reference value, the control unit 140 proceeds to step 228, and accepts the speech recognition result.

According to the present invention as described above, when a speech recognition failure occurs, the reason for speech recognition failures is ascertained through environmental analyses for the additional noise, the speaking rate, the loudness level and the transmission error of an input speech signal, and then this reason for speech recognition failure is reported to a user, so that the user can prevent failure occurrences according to failure reasons. Further, since reasons for false recognition are fed back to the user, the user can improve recognition environments, which results in an improvement in true recognition rate.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for reporting speech recognition failures, the apparatus comprising:
   a speech data detection unit for detecting pure speech data from input speech data and outputting the detected pure speech data;
   a speech recognition failure check unit for checking plurality of speech recognition failures for the pure speech data and outputting check-results for the plurality of speech recognition failures;

a speech recognition failure determination unit for determining whether the pure speech data is compatible with a speech recognition based on a combination of the check-results, ascertaining a dominant speech recognition failure reason of a plurality of speech recognition failure reasons according to the check-results when the pure speech data is incompatible with the speech recognition, and outputting the ascertained dominant speech recognition failure reason; and a control unit for controlling the pure speech data to be checked for the plurality of speech recognition failures through the speech recognition failure check unit, controlling the check-results for the plurality of speech recognition failures to be input into the speech recognition failure determination unit, and then controlling the dominant speech recognition failure reason output.

2. The apparatus as claimed in claim 1, wherein the speech recognition failure check unit comprises a channel transmission error checker unit for analyzing non-receive packets for a received input speech signal to thereby calculate a channel transmission error value, and determining if the input speech signal is compatible with speech recognition according to whether the channel transmission error value exceeds a predetermined transmission error reference value.

3. The apparatus as claimed in claim 1, wherein the speech recognition failure check unit comprises a loudness level checker unit for examining an energy level of an input speech signal, and determining if the input speech signal is compatible with speech recognition by comparing the energy level of the input speech signal with a predetermined level reference value.

4. The apparatus as claimed in claim 1, wherein the speech recognition failure check unit comprises a speaking rate checker unit for estimating a speaking rate of an input speech signal, and determining if the input speech signal is compatible with speech recognition by comparing the speaking rate of the input speech signal with a predetermined rate reference value.

5. The apparatus as claimed in claim 1, wherein the speech recognition failure check unit comprises a noise checker unit for extracting an ambient noise value for signals other than a speech signal included in an input speech signal, and determining if the input speech signal is compatible with speech recognition according to whether the ambient noise value exceeds a predetermined noise reference value.

6. A method of reporting speech recognition failures, the method comprising:

detecting pure speech data from input speech data and outputting the detected pure speech data;

checking a plurality of speech recognition failures for the pure speech data and outputting check-results for the plurality of speech recognition failures;

determining whether the pure speech data is compatible with a speech recognition Based on a combination of the check-results; and ascertaining a dominant speech recognition failure reason of a plurality of speech recognition failure reasons according to the check-results when the pure speech data is incompatible with the speech recognition and outputting the ascertained dominant speech recognition failure reason.

7. The method as claimed in claim 6, wherein the checking the plurality of speech recognition failures comprises analyzing non-receive packets for a received input speech signal to thereby calculate a channel transmission error value, and determining if the input speech signal is compatible with speech recognition according to whether the channel transmission error value exceeds a predetermined transmission error reference value.

8. The method as claimed in claim 6, wherein the checking the plurality of speech recognition failures comprises examining an energy level of an input speech signal, and determining if the input speech signal is compatible with speech recognition by comparing the energy level of the input speech signal with a predetermined level reference value.

9. The method as claimed in claim 6, wherein the checking the plurality of speech recognition failures comprises estimating a speaking rate of an input speech signal, and determining if the input speech signal is compatible with speech recognition by comparing the speaking rate of the input speech signal with a predetermined rate reference value.

10. The method as claimed in claim 6, wherein the checking the plurality of speech recognition failures comprises extracting an ambient noise value for signals other than a speech signal included in an input speech signal, and determining if the input speech signal is compatible with speech recognition according to whether the ambient noise value exceeds a predetermined noise reference value.

* * * * *